(12) United States Patent
Revelino et al.

(10) Patent No.: US 11,173,827 B2
(45) Date of Patent: Nov. 16, 2021

(54) SLIDE-OUT MECHANISM WITH A FIXED SPINDLE DRIVE

(71) Applicant: Lippert Components, Inc., Elkhart, IN (US)

(72) Inventors: Lawrence Revelino, Norco, CA (US); Neil Mears, Warrington (GB)

(73) Assignee: Lippert Components, Inc., Elkhart, IN (US)

( * ) Notice: Subject to any disclaimer, the term of this patent is extended or adjusted under 35 U.S.C. 154(b) by 251 days.

(21) Appl. No.: 16/530,059

(22) Filed: Aug. 2, 2019

(65) Prior Publication Data

US 2020/0317110 A1      Oct. 8, 2020

Related U.S. Application Data

(60) Provisional application No. 62/828,521, filed on Apr. 3, 2019.

(51) Int. Cl.
*B60P 3/34*          (2006.01)
*F16H 25/20*      (2006.01)

(52) U.S. Cl.
CPC ............... *B60P 3/34* (2013.01); *F16H 25/20* (2013.01)

(58) Field of Classification Search
CPC ..... F16H 25/20; F16H 2025/2075; B60P 3/34
See application file for complete search history.

(56) References Cited

U.S. PATENT DOCUMENTS

| | | |
|---|---|---|
| 5,634,683 A | 6/1997 | Young |
| 5,658,032 A | 8/1997 | Gardner |
| 6,266,931 B1 * | 7/2001 | Erickson ................... B60P 3/34 296/165 |
| 6,471,275 B1 * | 10/2002 | Kunz ........................ B60P 3/34 296/171 |
| 6,494,518 B2 * | 12/2002 | Kreil ........................ B60P 3/34 296/26.01 |
| 6,698,818 B2 * | 3/2004 | Crean ....................... B60P 3/34 296/165 |
| 6,729,669 B2 * | 5/2004 | McManus ................. B60P 3/34 296/172 |
| 7,328,927 B1 * | 2/2008 | Crean ....................... B60P 3/34 296/165 |
| 7,387,325 B2 * | 6/2008 | Herson ..................... B60P 3/34 296/165 |

(Continued)

FOREIGN PATENT DOCUMENTS

| | | |
|---|---|---|
| KR | 10-1040088 | 6/2011 |
| WO | WO 2016/159769 | 10/2016 |

OTHER PUBLICATIONS

European Search Report dated Mar. 25, 2020 issued in European Patent Application No. 19196248.9, 7 pp.

(Continued)

*Primary Examiner* — David M Fenstermacher
(74) *Attorney, Agent, or Firm* — Nixon & Vanderhye P.C.

(57) ABSTRACT

A slide-out room system includes a drive mechanism that may be fixed to a vehicle wall adjacent the slide-out room. A drive unit includes a drive screw that is rotatable with rotation of an output shaft. A drive block that engages the drive screw may be fixed to a side wall of the slide-out room. Rotation of the drive screw effects displacement of the drive block to extend and retract the room, depending on a rotation direction of the motor.

9 Claims, 5 Drawing Sheets

(56) References Cited

U.S. PATENT DOCUMENTS

| | | | | |
|---|---|---|---|---|
| 7,802,834 B2* | 9/2010 | Cadena | ............ | B60P 3/34 |
| | | | | 296/26.13 |
| 8,480,159 B2* | 7/2013 | Jones | ............ | B60P 3/34 |
| | | | | 296/175 |
| 8,555,558 B1* | 10/2013 | Trout | ............ | B60P 3/34 |
| | | | | 52/67 |
| 8,844,212 B1* | 9/2014 | Trout | ............ | E04B 1/34305 |
| | | | | 52/67 |
| 8,959,843 B2* | 2/2015 | Trout | ............ | E04B 1/34305 |
| | | | | 52/67 |
| 9,597,993 B2* | 3/2017 | Pellicer | ............ | B60P 3/39 |
| 9,636,958 B2* | 5/2017 | Patterson | ............ | E04H 15/56 |
| 9,834,127 B2* | 12/2017 | Caulder | ............ | B60P 3/07 |
| 10,029,602 B1* | 7/2018 | Spickler | ............ | B60P 3/39 |
| 10,967,777 B2* | 4/2021 | Howie | ............ | B60P 3/34 |
| 2002/0084663 A1 | 7/2002 | McManus et al. | | |
| 2005/0184546 A1 | 8/2005 | Kunz et al. | | |
| 2011/0025091 A1 | 2/2011 | Schwindaman et al. | | |
| 2018/0086248 A1 | 3/2018 | Rodabaugh | | |

OTHER PUBLICATIONS

Australian Examination Report No. 1 dated Jul. 23, 2020 issued in Australian Patent Application No. 2019208210, 8 pp.

* cited by examiner

SLIDE-OUT MECHANISM WITH A FIXED SPINDLE DRIVE

CROSS-REFERENCES TO RELATED APPLICATIONS

This application claims the benefit of U.S. Provisional Patent Application No. 62/828,521, filed Apr. 3, 2019, the entire content of which is herein incorporated by reference.

STATEMENT REGARDING FEDERALLY SPONSORED RESEARCH OR DEVELOPMENT (NOT APPLICABLE)

BACKGROUND

The invention relates to a slide-out or retractable room for mobile living quarters, such as a recreational vehicle.

Recreational vehicles, such as motor homes, fifth-wheel trailers, and travel trailers may be provided with a retractable or slide-out room for increasing the living space of the vehicle. The retractable or slide-out room is extended for use when the vehicle is parked and is retracted into the main living area of the vehicle when the vehicle is in transit. Slide-out rooms typically require substantial space for mounting large electrical motors and hydraulic units that require the construction of expensive covers and thus reduce the overall space inside the vehicle.

Existing mechanisms for extending and retracting slide-out rooms utilize a drive screw that is designed to stay in tension. When improperly constructed, the screw can compress, which causes the screw to bow and contact the housing. Additionally, it is typical for the motor on the screw drive to move with the room, which also requires the wires to move.

Other problems with existing systems include undesirably exposed operating components when the room is expanded as well as inadequate sealing during transition between retracted and expanded positions.

BRIEF SUMMARY

It would thus be desirable for a slide-out room system that overcomes shortcomings of existing systems. In some embodiments, the drive system includes a drive unit fixed to a vehicle wall adjacent the slide-out room. A drive screw may be coupled with the drive unit that is rotatable with rotation of a motor output shaft, and a drive block may be securable to a side wall of the slide-out room. The drive block may engage the drive screw such that rotation of the drive screw effects displacement of the drive block.

The screw drive system is thus fixed to an interior vehicle wall rather than to the movable slide-out room. Only the drive block is fixed to the moving room. The system is functional with two or four drive units. Moreover, the drive mechanism is not visible on the exterior of the room, even in the expanded position.

BRIEF DESCRIPTION OF THE DRAWINGS

These and other aspects and advantages will be described in detail with reference to the accompanying drawings, in which.

DETAILED DESCRIPTION

Figure 1:
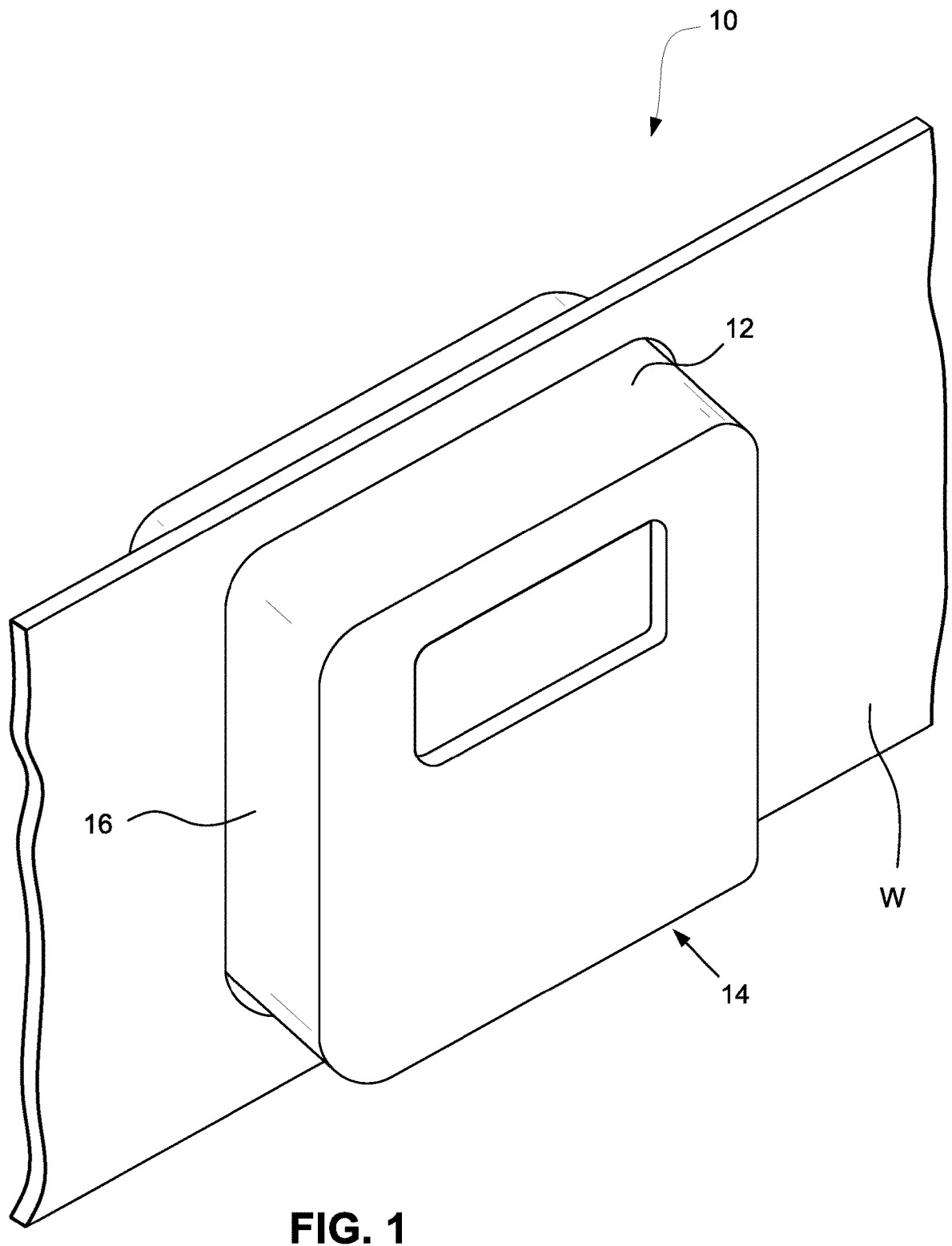
FIG. 1 is a perspective view of a slide-out room system for a vehicle.

FIG. 1 is a perspective view of a slide-out room system 10 for a vehicle. The system 10 includes a room defined by a top wall 12, a floor 14 and a pair of side walls 16 connected between the top wall 12 and the floor 14. The room corners may be rounded. In FIG. 1, the slide-out room is shown in an extended or expanded position. The slide-out room extends through an opening in a wall W typically in the side of a vehicle. The view in FIG. 1 shows an exterior of the vehicle wall W.

Figure 2:
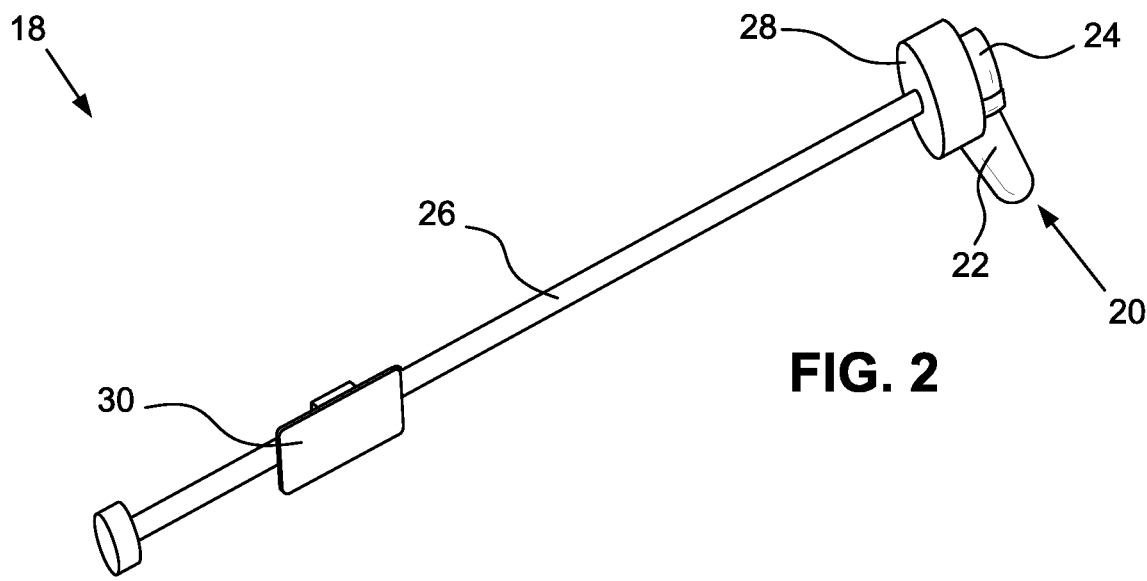
FIG. 2 shows an exemplary drive mechanism of the described embodiments.
Figure 3:
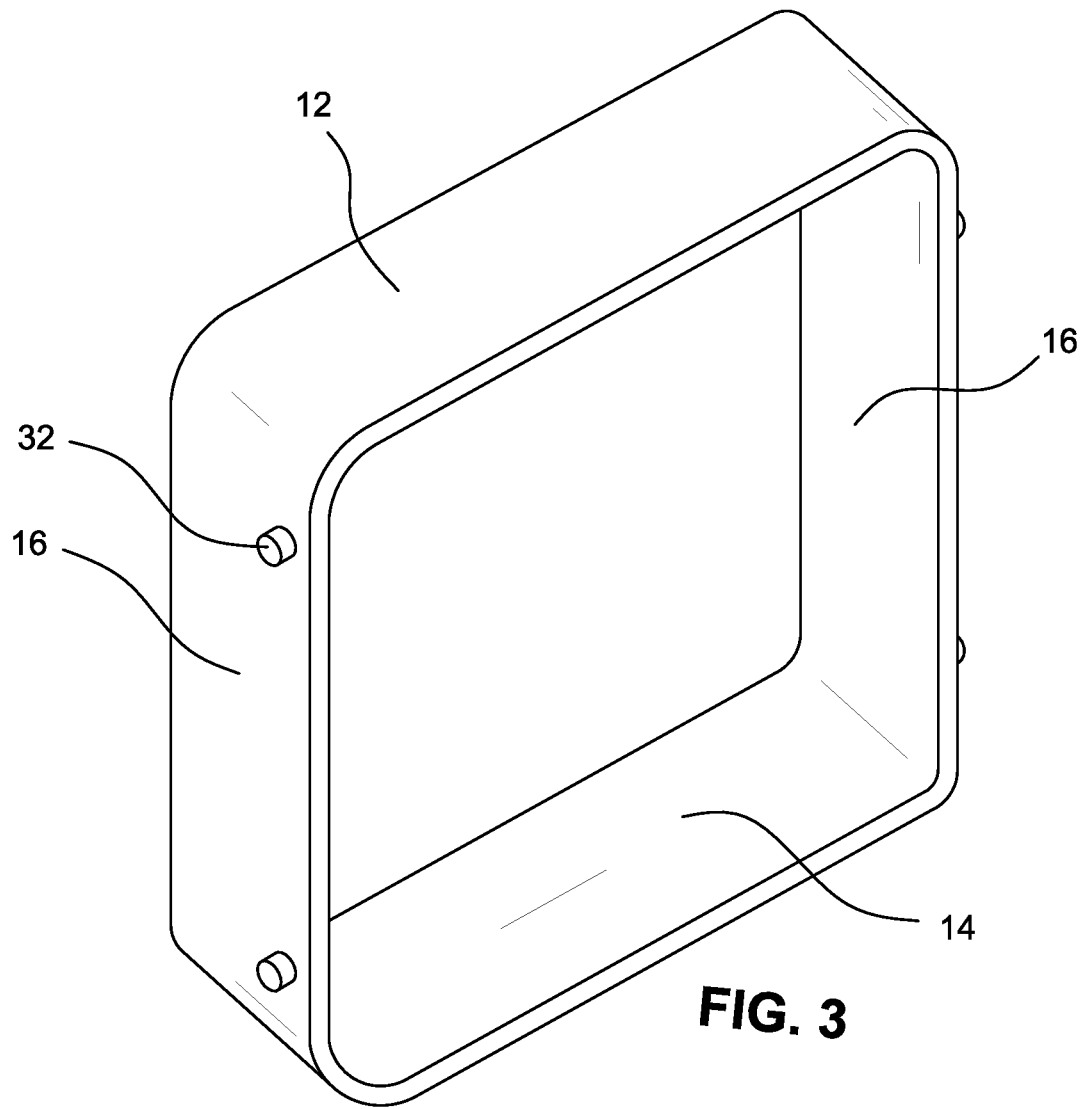
FIG. 3 is a perspective view of a slide-out room including drive brackets fixed to side walls of the slide-out room.
Figure 4:
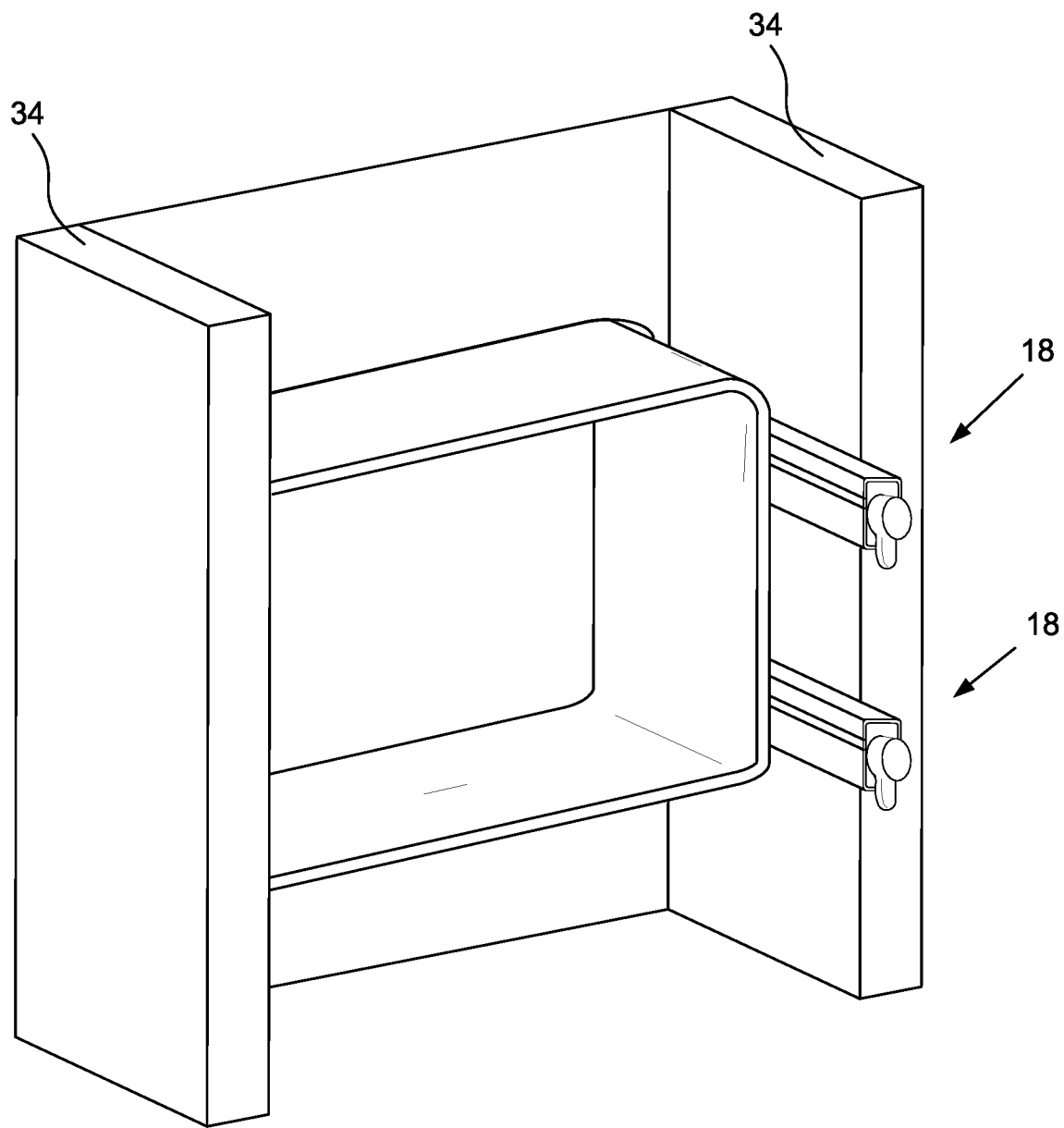
FIG. 4 is a perspective view of the slide-out room system.

With reference to FIGS. 2-4, a drive mechanism 18 for a slide-out room includes drive components that are securable to a wall adjacent the slide-out room and are thus fixed relative to the slide-out room. The drive mechanism 18 includes a drive unit 20 securable to the wall adjacent the slide-out room and including an electric motor 22 with an output shaft 24. A drive screw 26 is coupled with the drive unit 20 and is rotatable with rotation of the output shaft 24. A gear train 28 is interposed between the output shaft 24 and the drive screw 26. Details of a suitable drive unit are described in International Patent Publication WO 2016/159769, the contents of which are hereby incorporated by reference.

A drive block 30 is securable to a side wall 16 of the slide-out room. The drive block 30 engages the drive screw 26 such that rotation of the drive screw 26 effects displacement of the drive block 30. In some embodiments, the drive block 30 is connectable to a drive bracket 32 that is fixed to the side wall 16 of the slide-out room.

With the drive block 30 threaded on the drive screw 26, rotation of the drive screw 26 effects forward and aft displacement of the drive block 30 depending on a rotation direction of the drive screw 26. With the drive block 30 secured to the slide-out room via the drive brackets 32 or the like, displacement of the drive blocks 30 via the drive screws 26 thereby extends and retracts the slide-out room.

As shown in FIG. 4, the system may include two drive mechanisms 18 cooperable with each of the pair of side walls 16 of the slide-out room. The two drive mechanisms 18 correspond to upper and lower drive mechanisms for supporting and driving the slide-out room. In this configuration, the slide-out room is thus provided with a corresponding two of the drive brackets 32 secured to each of the side walls 16.

Figure 5:
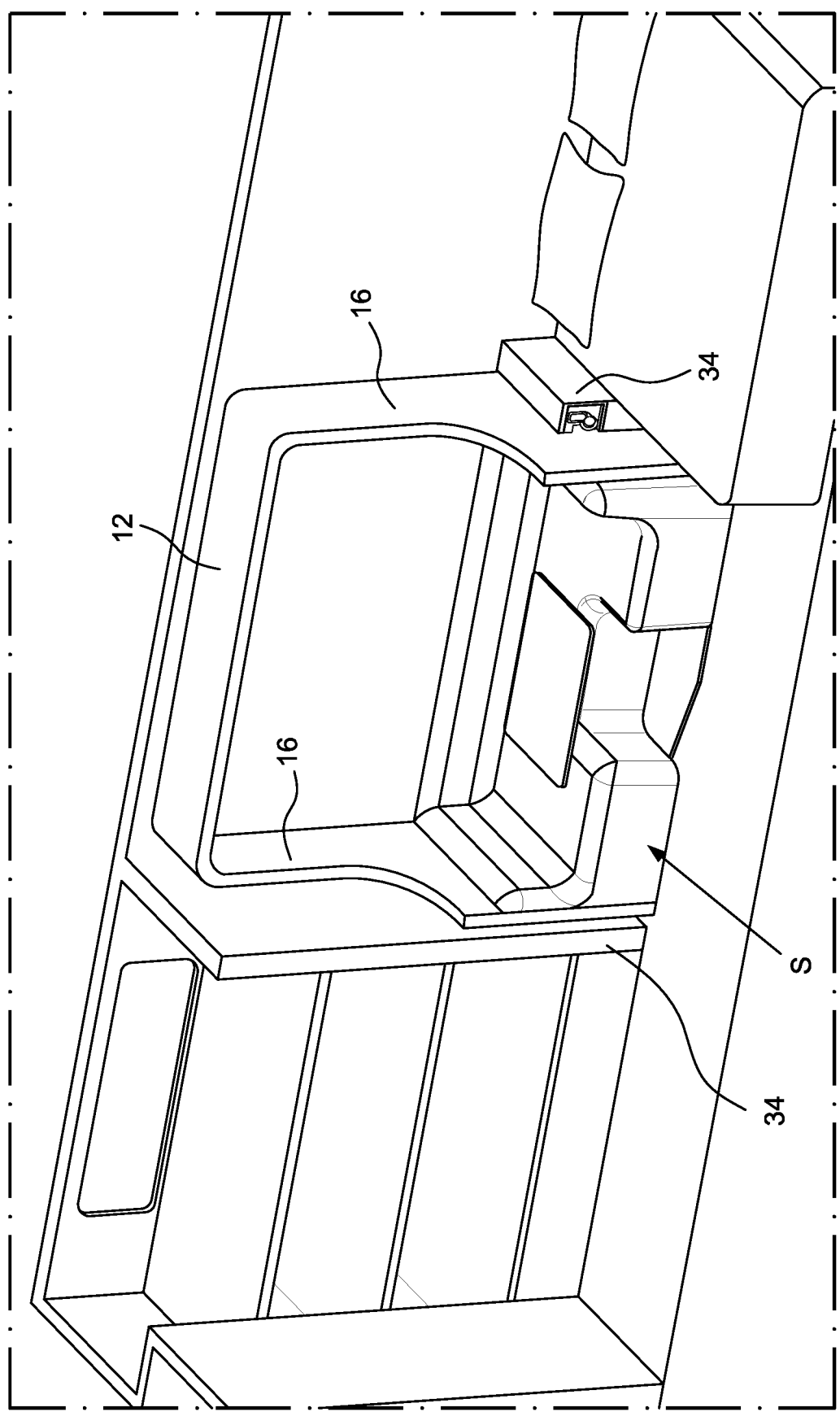
FIG. 5 shows an exemplary application of the slide-out room system.
Figure 6:
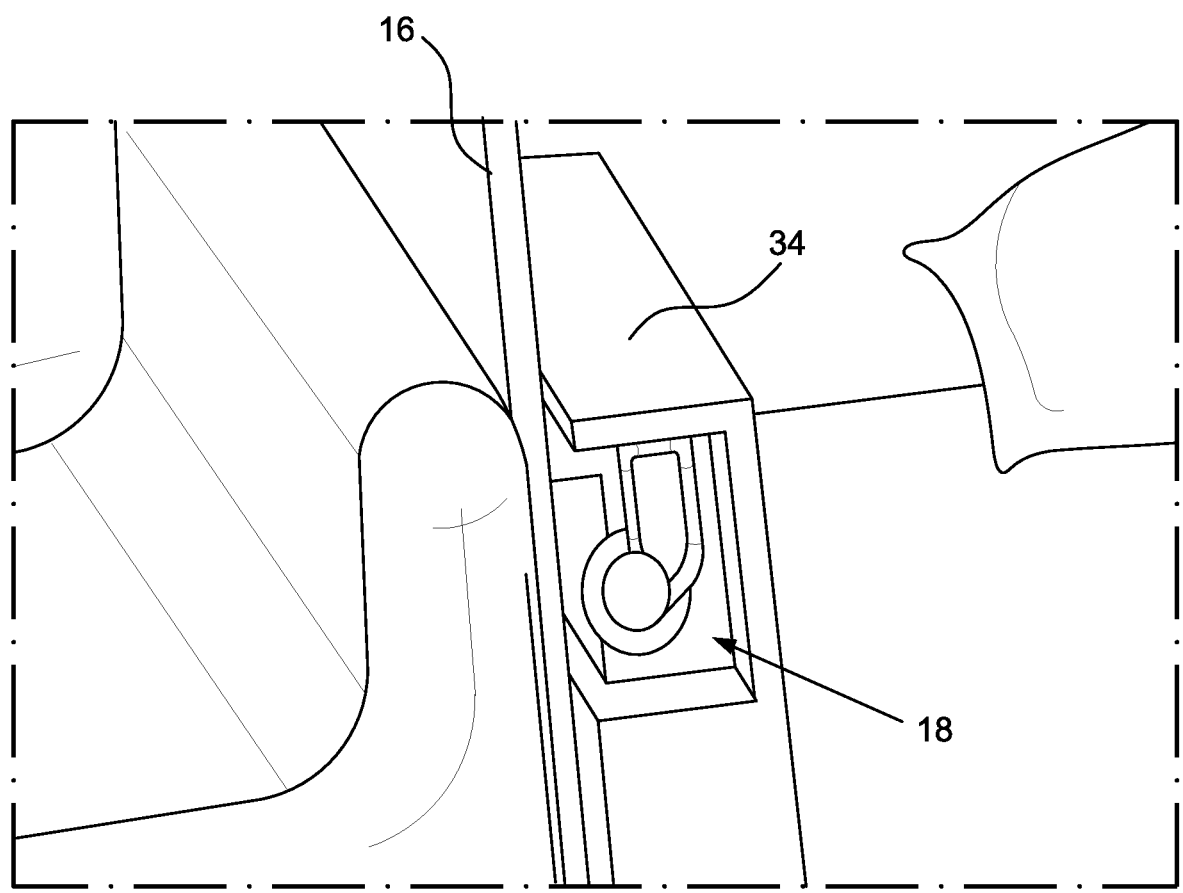
FIG. 6 is a close-up view of an encasement wall showing the drive mechanism installed adjacent the slide-out room.

With continued reference to FIG. 4 and with reference to FIGS. 5 and 6, the vehicle walls adjacent each of the pair of side walls 16 to which the drive mechanisms are secured may be encasement walls 34 that extend into the vehicle interior. FIGS. 5 and 6 show an exemplary application of the slide-out room system. FIG. 5 shows a sofa slide with a sofa S positioned between the encasement walls 34 within the slide-out room. As would be appreciated by those of ordinary skill in the art, the same construction could be used for a bed slide with the sofa S in FIG. 5 replaced with a bed. In the construction shown in FIGS. 5 and 6, only one of the drive mechanisms 18 acts on each of the side walls 16 of the slide out room. The drive mechanisms 18 are embedded in the encasement walls 34 as shown.

A narrow frame member may be secured in the opening in the vehicle wall W, and a seal member such as a V-shaped seal or "V seal" may be positioned between the narrow frame and the slide-out room. Since the frame and seal are fixed in the vehicle opening, the slide-out room is displaceable relative to the seal, and the slide-out room remains sealed in the retracted position, the extended position and while transitioning between the retracted and extended positions.

Because the drive mechanism is fixed to an interior wall of the vehicle rather than to the slide-out room, the drive mechanism does not move with the slide-out room. The drive mechanisms are easier to conceal and are lighter than other mechanism types. Additionally, by securing only the drive block to the slide-out room, e.g., via the drive bracket, the tracks/channels and other associated drive components are not visible from the exterior, even with the room in its expanded position. Moreover, with the drive mechanism secured in the vehicle walls, the system provides better support than existing configurations when the room is retracted for road travel. The slide-out room system is adaptable for two or four of the drive mechanisms, depending on the application.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A slide-out room system for a vehicle, the slide-out room system comprising:
   a room defined by a top wall, a floor, and a pair of side walls connected between the top wall and the floor;
   a drive unit secured to a vehicle wall adjacent each of the pair of side walls such that the drive units are fixed relative to the room, the drive units each including an electric motor and an output shaft;
   a drive screw coupled with each of the drive units and rotatable with rotation of the output shafts, the drive screws respectively extending along each of the pair of side walls; and
   a drive block secured to each of the pair of side walls, the drive blocks respectively engaging the drive screws, wherein rotation of the drive screws effects displacement of the drive blocks via the connections between the drive blocks and each of the pair of side walls.

2. A drive mechanism according to claim 1, further comprising a gear train between the output shaft and the drive screw.

3. A slide-out room system according to claim 1, wherein the vehicle walls adjacent each of the pair of side walls comprise encasement walls extending into the vehicle.

4. A slide-out room system according to claim 3, wherein one of a sofa and a bed is positioned between the encasement walls and is displaceable with the slide-out room.

5. A slide-out room system according to claim 1, comprising a two of the drive units with a corresponding two of the drive screws and two of the drive blocks cooperable with each of the pair of side walls.

6. A slide-out room system according to claim 1, further comprising a drive bracket fixed to each of the side walls, the drive blocks respectively engaging the drive brackets.

7. A slide-out room system according to claim 1, further comprising a stop block at a distal end of each of the drive screws.

8. A drive mechanism in combination with a slide-out room, the combination comprising:
   a drive unit securable to a wall adjacent a side wall of the slide-out room such that the drive unit is fixed relative to the slide-out room; and
   a driven unit fixed to side wall of the slide-out room and coupled with the drive unit, the driven unit being displaceable relative to the drive unit by the drive unit such that the drive unit is fixed relative to the slide-out room.

9. A drive mechanism according to claim 8, wherein the drive unit comprises one of an electric motor coupled with a drive screw and an electric motor coupled with a drive gear, and wherein the driven unit comprises one of a drive block engaging the drive screw and a gear rack with which the drive gear is engaged.

* * * * *